(12) United States Patent  (10) Patent No.: US 8,102,476 B2
Son et al.  (45) Date of Patent: Jan. 24, 2012

(54) DISPLAY DEVICES INCLUDING AN OXIDE SEMICONDUCTOR THIN FILM TRANSISTOR

(75) Inventors: Kyoung-seok Son, Seoul (KR); Sang-yoon Lee, Seoul (KR); Myung-kwan Ryu, Yongin-si (KR); Tae-sang Kim, Seoul (KR); Jang-yeon Kwon, Seongnam-si (KR); Kyung-bae Park, Seoul (KR); Ji-sim Jung, Incheon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 393 days.

(21) Appl. No.: 12/153,657

(22) Filed: May 22, 2008

(65) Prior Publication Data

US 2009/0141203 A1 Jun. 4, 2009

(30) Foreign Application Priority Data

Dec. 3, 2007 (KR) .......................... 10-2007-0124382

(51) Int. Cl.
*G02F 1/1333* (2006.01)
(52) U.S. Cl. ............................... 349/14; 349/38; 349/39
(58) Field of Classification Search .............. 349/38–39, 349/140
See application file for complete search history.

(56) References Cited

U.S. PATENT DOCUMENTS

| 7,440,040 B2* | 10/2008 | Kwak et al. ...................... 349/39 |
| 2007/0188671 A1* | 8/2007 | Hwang et al. .................... 349/43 |
| 2007/0252928 A1* | 11/2007 | Ito et al. ......................... 349/106 |

* cited by examiner

*Primary Examiner* — Phu Vu
(74) *Attorney, Agent, or Firm* — Harness, Dickey & Pierce, P.L.C.

(57) ABSTRACT

A display device including an oxide semiconductor thin film transistor is provided. The display device includes at least one thin film transistor, and at least one storage capacitor. The storage capacitor includes a storage electrode formed of a transparent oxide semiconductor, and a pixel electrode over the storage electrode. The pixel electrode may be separated from the storage electrode by a desired distance.

22 Claims, 5 Drawing Sheets

DISPLAY DEVICES INCLUDING AN OXIDE SEMICONDUCTOR THIN FILM TRANSISTOR

PRIORITY STATEMENT

This application claims the benefit of priority under 35 U.S.C. §119 from Korean Patent Application No. 10-2007-0124382, filed on Dec. 3, 2007 in the Korean Intellectual Property Office, the disclosure of which is incorporated herein in its entirety by reference.

BACKGROUND

1. Field

Example embodiments relate to display devices. Other example embodiments relate to display devices including a driving unit having an oxide semiconductor thin film transistor.

2. Description of the Related Art

Conventional display devices (e.g., liquid crystal displays (LCD) or organic light emitting devices (OLED)) may have a driving unit including at least one thin film transistor (TFT) and at least one storage capacitor. The storage capacitor retains a constant voltage by accumulating charges for a desired period of time. The storage capacitor may have a structure in which an insulator is inserted between two electrodes. For example, in an LCD, the storage capacitor may have a structure in which a gate insulating layer and a passivation layer are between a storage electrode formed of a gate metal and a pixel electrode formed of a transparent conductor. The storage capacitor may have a structure in which a gate insulating layer is between a storage electrode formed of a gate metal, and a counter electrode formed of a source-drain metal. In order to form the storage electrode, a metal having a substantially low resistance may be used to prevent (or reduce) degradation of image quality due to resistive-capacitive (RC) delay. However, if the storage electrode is formed using the metal having substantially low resistance, light incident from a backlight unit may not pass through the storage electrode, decreasing the panel light transmittivity. Because a sufficient charge capacity is needed to retain a constant pixel voltage during a frame, reduction of the surface area of the storage electrode, in order to prevent the panel light transmittivity from decreasing, may be limited For similar reasons, the panel light transmittivity in an OLED may decrease due to a plurality of storage capacitors.

SUMMARY

Example embodiments relate to display devices. Other example embodiments relate to display devices including a driving unit having an oxide semiconductor thin film transistor.

According to example embodiments, there is provided a display device including at least one thin film transistor, and at least one storage capacitor, both formed on a substrate. The storage capacitor may include a storage electrode formed of a transparent oxide semiconductor, and a pixel electrode over (or facing) the storage electrode. The pixel electrode may be separated from the storage electrode by a desired distance.

The transparent oxide semiconductor may include at least one oxide compound selected from the group consisting of zinc oxide, tin oxide, Ga—In—Zn oxide, In—Zn oxide, In—Sn oxide, and combinations thereof. The at least one oxide compound may be doped with at least one metal selected from the group consisting of aluminum (Al), nickel (Ni), copper (Cu), tantalum (Ta), hafnium (Hf), titanium (Ti) and combinations thereof. The pixel electrode may be formed of at least one transparent conductive material selected from the group consisting of indium tin oxide (ITO), indium zinc oxide (IZO) and combinations thereof.

The thin film transistor may include a gate, a channel layer corresponding to the gate, a gate insulating layer formed between the gate and the channel layer, source and drain electrodes formed on opposing sides of the channel layer, and a passivation layer covering the source and drain electrodes. The channel layer may be formed of the transparent oxide semiconductor.

A storage electrode wiring, which is electrically connected to the storage electrode, and the gate may be formed on a same plane (or surface) of the substrate.

The display device may include an etch stop layer covering the channel layer between the source and drain electrodes. The etch stop layer may be formed of a silicon oxide.

According to example embodiments there is provided a display device including at least one thin film transistor, and at least one storage capacitor. Each thin film transistor may include a gate formed on a substrate, a gate insulating layer covering the gate, a channel layer corresponding to the gate and formed of a transparent oxide semiconductor, source and drain electrodes formed on opposing sides of the channel layer, and a passivation layer covering the source and drain electrodes.

Each storage capacitor may include a storage electrode wiring formed on the substrate, the gate insulating layer covering the storage electrode wiring, a storage electrode formed on the gate insulating layer and formed of the transparent oxide semiconductor, the passivation layer covering the storage electrode, and a pixel electrode formed on the passivation layer and over (or facing) the storage electrode.

The storage electrode may be formed on the gate insulating layer between the gate and the storage electrode wiring.

The pixel electrode may be electrically connected to the drain electrode via the passivation layer. The storage electrode may be electrically connected to the storage electrode wiring via the passivation layer and the gate insulating layer.

According to example embodiments, there is provided a display device including at least one thin film transistor, and at least one storage capacitor. Each thin film transistor may include a channel layer formed of a transparent oxide semiconductor on a substrate, a gate insulating layer covering the channel layer, a gate formed on the gate insulating layer and corresponding to the channel layer, an interlayer dielectric layer covering the gate, source and drain electrodes formed on the interlayer dielectric layer and electrically connected to opposing sides of the channel layer, and a passivation layer covering the interlayer dielectric layer and the source and drain electrodes.

Each storage capacitor may include a storage electrode formed of the transparent oxide semiconductor on the substrate, the gate insulating layer covering the storage electrode, a storage electrode wiring formed on and electrically connected to the gate insulating layer, the interlayer dielectric layer covering the storage electrode wiring, the passivation layer formed on the interlayer dielectric layer, and a pixel electrode formed on the passivation layer and over (or facing) the storage electrode.

The storage electrode may be formed on the substrate between the gate and the storage electrode wiring.

BRIEF DESCRIPTION OF THE DRAWINGS

Example embodiments will be more clearly understood from the following detailed description taken in conjunction with the accompanying drawings.

FIG. 1 is a plane view of a driving unit of a display device according to example embodiments;

FIG. 2 is a cross-sectional view of the driving unit along line II-II' in FIG. 1;

FIG. 3 is a graph showing a current-voltage (I-V) characteristic of an oxide semiconductor thin film transistor according to example embodiments;

FIG. 4 is a cross-sectional view of another example of the driving unit of the display device of FIG. 1; and FIG. 5 is a cross-sectional view of a driving unit of a display device according to example embodiments.

DETAILED DESCRIPTION OF EXAMPLE EMBODIMENTS

Figure 1:
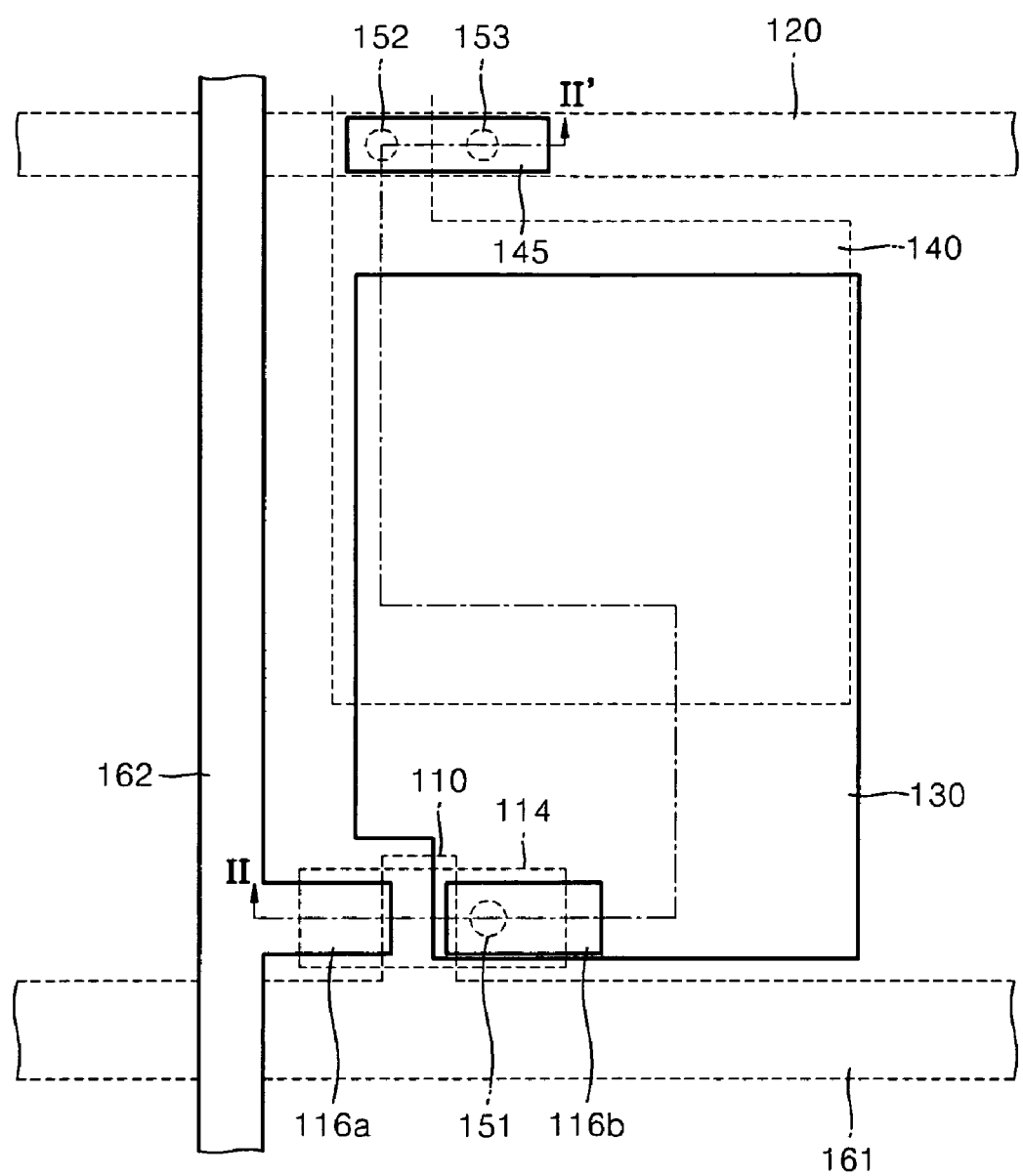
FIGS. 1-5 represent non-limiting, example embodiments as described herein.

Various example embodiments will now be described more fully with reference to the accompanying drawings in which some example embodiments are shown. In the drawings, the thicknesses of layers and regions may be exaggerated for clarity.

Detailed illustrative embodiments are disclosed herein. However, specific structural and functional details disclosed herein are merely representative for purposes of describing example embodiments. This invention, however, may be embodied in many alternate forms and should not be construed as limited to only example embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the scope of example embodiments.

Spatially relative terms, such as "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the Figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

In order to more specifically describe example embodiments, various aspects will be described in detail with reference to the attached drawings. However, the present invention is not limited to example embodiments described.

Example embodiments relate to a display device including at least one thin film transistor and at least one storage capacitor that form a driving unit. The storage capacitor retains a pixel voltage during a frame by accumulating a voltage for a desired period of time. Examples of the display device include a liquid crystal display (LCD), an organic light emitting device (OLED) and the like.

Figure 2:
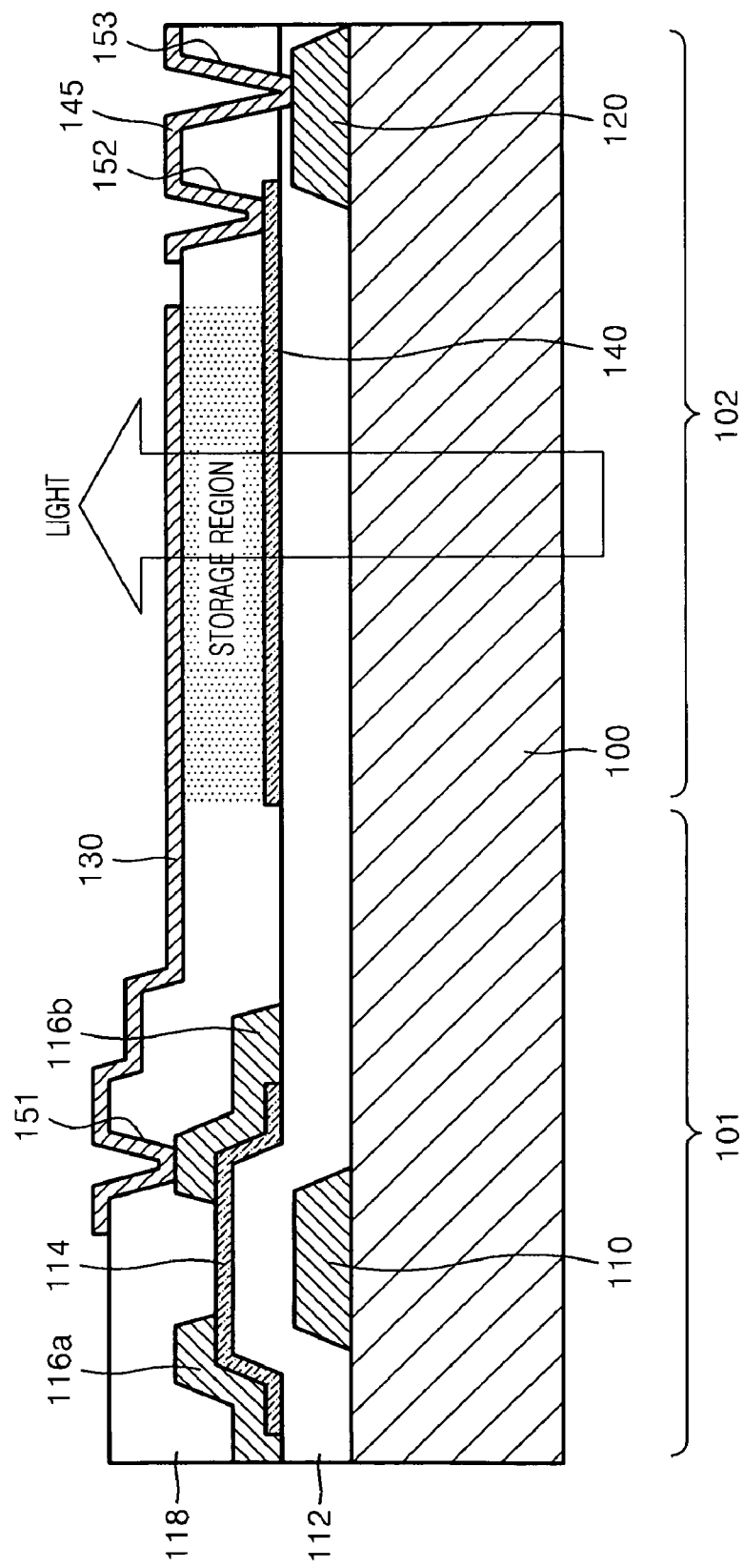

FIG. 1 is a plane view of a driving unit of a display device according to example embodiments. FIG. 2 is a cross-sectional view of the driving unit along line II-II' in FIG. 1.

Referring to FIGS. 1 and 2, the display device includes at least one thin film transistor (TFT) 101 and at least one storage capacitor 102 that form a driving unit. A gate 110, a gate insulating layer 112, a channel layer 114, source and drain electrodes 116a and 116b, and a passivation layer 118 may be sequentially formed on a substrate 100. The storage capacitor includes a storage electrode wiring 120, the gate insulating layer 112, a storage electrode 140, the passivation layer 118, and a pixel electrode 130, that may be sequentially formed on the substrate 100.

The substrate 100 may be a transparent substrate (e.g., a glass substrate or a plastic substrate). The gate 110 and the storage electrode wiring 120 may be formed on a same plane (or surface) of the substrate 100. The gate 110 and the storage electrode wiring 120 may be separated from each other by a desired distance. The gate 110 may be electrically connected to a gate wiring 161. The storage electrode wiring 120, which may be a common electrode wiring, may be electrically connected to the storage electrode 140. The gate 110 and the storage electrode wiring 120 may be formed by depositing a gate metal (not shown) on the substrate 100 and patterning the gate metal. The storage electrode wiring 120 prevents (or reduces) changing (or fluctuations) of a common voltage applied to the storage electrode 140 by a resistive-capacitive (RC) delay. The storage electrode wiring 120 may not be a counter electrode to the pixel electrode 130. As such, the storage electrode wiring 120 may be formed with a smaller width, increasing the panel light transmittivity.

The gate insulating layer 112 may be deposited on (or over) the substrate 100 to cover the gate 110 and the storage electrode wiring 120. The gate insulating layer 112 may be formed of a silicon oxide or a silicon nitride. The channel layer 114 may be formed on the gate insulating layer 112 disposed on the gate 110. The storage electrode 140 may be formed on the gate insulating layer 112, between the gate 110 and the storage electrode wiring 120. The channel layer 114 and the storage electrode 140 may be formed of a transparent oxide semiconductor. Examples of the transparent oxide semiconductor include, but are not limited to, zinc oxide, tin oxide, Ga—In—Zn oxide, In—Zn oxide, In—Sn oxide and combinations thereof. Any one of the aforementioned oxide compounds may be doped with at least one metal selected from the group consisting of aluminum (Al), nickel (Ni), copper (Cu), tantalum (Ta), hafnium (Hf), titanium (Ti) and combinations thereof.

The channel layer 114 and the storage electrode 140 may be formed by depositing the transparent oxide semiconductor on the gate insulating layer 112 and patterning the same. Because the storage electrode 140 formed of the transparent oxide semiconductor is formed on the gate insulating layer 112 between the gate 110 and the storage electrode wiring 120, the panel light transmittivity may increase and the surface area of the storage electrode 140 facing the pixel electrode 130 may be increased. As such, the storage region may increase, providing a sufficient (or larger) charge capacity.

Source and drain electrodes 116a and 116b may be respectively formed on opposing sides of the channel layer 114, which is formed of the transparent oxide semiconductor. The source and drain electrodes 116a and 116b may be formed by forming a desired metal layer (not shown) to cover the channel layer 114 and patterning the same. The metal layer may have a single-layer structure or a multiple-layer structure. The metal layer may be formed of at least one metal selected from the group consisting of copper (Cu), molybdenum (Mo), aluminum (Al) and combinations thereof. However, example embodiments are not limited thereto. The source electrode 116a may be electrically connected to a data wiring 162.

The passivation layer 118 may be formed on the gate insulating layer 112 to cover the source and drain electrodes 116a and 116b, the channel layer 114, and the storage electrode 140. The passivation layer 118 may be formed of a silicon nitride, a silicon oxide, an organic insulator or the like. The pixel electrode 130 may be formed on the passivation layer 118, which is disposed on the storage electrode 140. The pixel electrode 130 may be formed over (or facing) the storage electrode 140. The pixel electrode 130 may be formed of a transparent conductive material (e.g., indium tin oxide (ITO) or indium zinc oxide (IZO)). The pixel electrode 130 may be electrically connected to the drain electrode 116b via a first via hole 151 formed in the passivation layer 118.

A connection wiring 145 electrically connecting the storage electrode 140 and the storage electrode wiring 120 may be formed on the passivation layer 118 disposed on the storage electrode wiring 120. The connection wiring 145 electrically connects the storage electrode 140 and the storage electrode wiring 120 via a second via hole 152, which is formed in the passivation layer 118, and a third via hole 153, which is formed in the passivation layer 118 and the gate insulating layer 112. Similar to the pixel electrode 130, the connection wiring 145 may be formed of a transparent conductive material (e.g., ITO or IZO). In the storage capacitor having the above structure, if the TFT is turned on, a pixel voltage applied to the pixel electrode 130 may be retained in the passivation layer 118 between the pixel electrode 130 and the storage electrode 140.

In the display devices according to example embodiments, the storage electrode 140 formed of a transparent oxide semiconductor and having a larger surface area is formed on the gate insulating layer 112 between the gate 110 and the storage electrode wiring 120. As such, the panel light transmittivity may increase and/or a larger (or more sufficient) charge capacity may be provided.

A gate insulating layer may be formed having a substantially large thickness (e.g., approximately 300 nm or greater) to prevent a defect caused by a short circuit between a gate wiring and a data wiring.

In example embodiments, the passivation layer 118 may be formed having a substantially small thickness (e.g., about 20 nm). As such, the charge capacity of the storage capacitor may increase.

Figure 3:
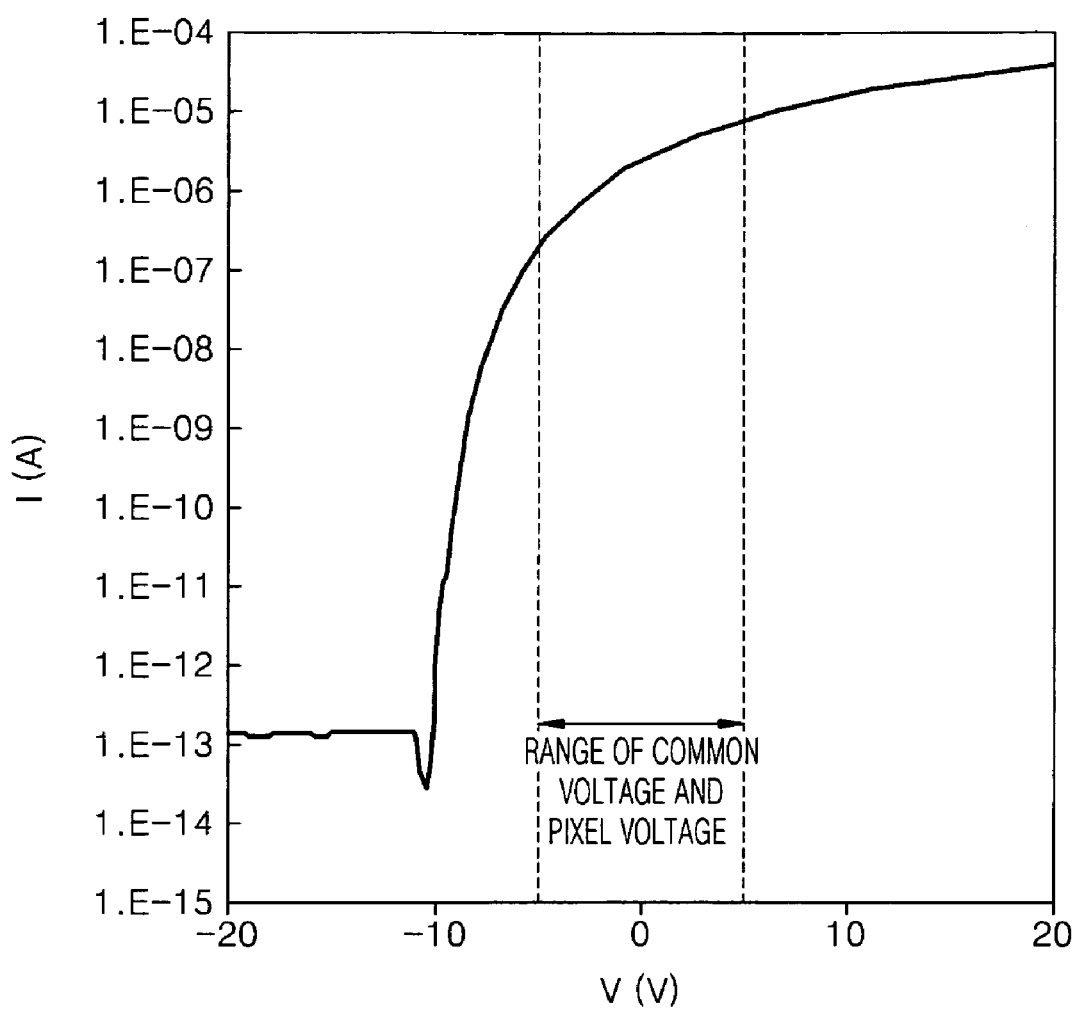

FIG. 3 is a graph showing a current-voltage (I-V) characteristic of the TFT including a channel layer formed in the transparent oxide semiconductor according to example embodiments.

Referring to FIG. 3, the oxide semiconductor TFT may be operated in a depletion mode at a higher current even if the gate voltage is 0 V due to a higher carrier density in the oxide semiconductor. The transparent oxide semiconductor according to example embodiments may be used as a storage electrode because the transparent oxide semiconductor has similar characteristics as a conductor in the range of a common voltage applied to the storage electrode, and in the range of a pixel voltage applied to the pixel electrode.

Figure 4:
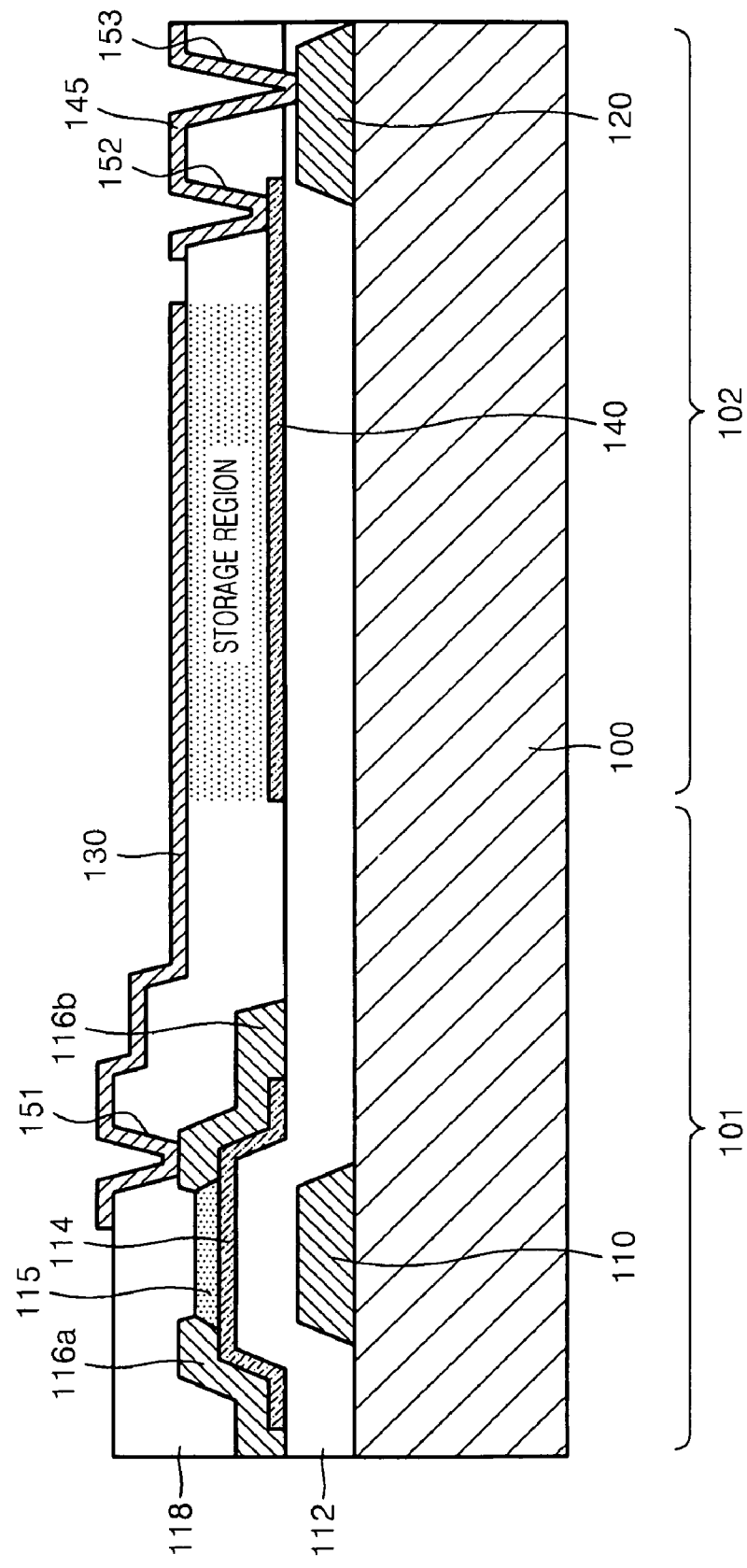

FIG. 4 is a cross-sectional view of another example of the driving unit of the display device of FIG. 1. The driving unit of FIG. 4 has a similar structure as the driving unit of FIG. 3, except that an etch stop layer 115 may be formed between the channel layer 114 and the passivation layer 118. Thus, a description of like elements will be omitted for the sake of brevity.

Referring to FIG. 4, the etch stop layer 115 may be formed between the channel layer 114 and the passivation layer 118. The etch stop layer 115 may be formed on the channel layer between the source and drain electrodes 116a and 116b. The etch stop layer 115 may be formed of a silicon oxide.

A silicon oxide may be used as a passivation layer for the channel layer 114, which is formed of an oxide semiconductor, because excessive generation of carriers may be suppressed in the oxide semiconductor by oxygen supplied during deposition of a silicon oxide. As such, a threshold voltage of the TFT may be maintained within a desired range.

Silicon nitride is more desirable than silicon oxide because the silicon nitride blocks external influences (e.g., water or hydrogen). Although silicon nitride may more efficiently prevent (or reduce) external influence, silicon nitride does not contain oxidative ions and/or may generate a higher leakage current because the oxide semiconductor is deoxidized due to a larger amount of hydrogen.

According to example embodiments, if the etch stop layer 115 formed of a silicon oxide is formed between the channel layer 114 and the passivation layer 118, desirable thin film transistor characteristics are observed. Because the passivation layer 118 may be formed of a silicon nitride, desirable characteristics of the passivation layer 118 may increase, simultaneously. The oxide semiconductor, which is used to form the storage electrode 140 from the deposited passivation layer 118, may exhibit similar characteristics as a conductor due to the higher carrier density because the etch stop layer 115 is not formed on the storage electrode 140 formed of a transparent oxide semiconductor.

Figure 5:
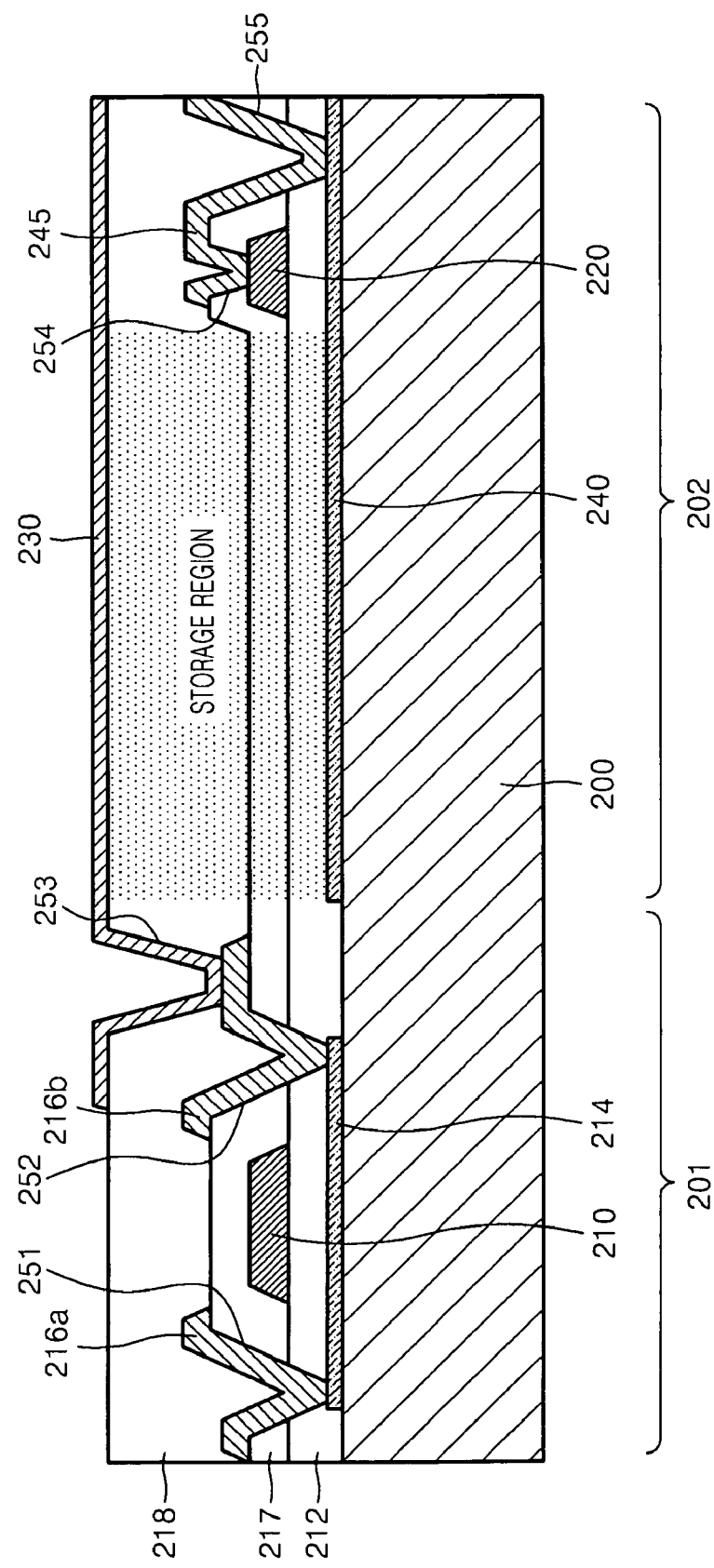

FIG. 5 is a cross-sectional view of a driving unit of a display device according to example embodiments.

Referring to FIG. 5, the display device according to example embodiments includes at least one TFT 201 and at least one storage capacitor 202 that form a driving unit. The TFT 201 has a top gate structure. The TFT includes a channel layer 214, a gate insulating layer 212, a gate 210, an interlayer dielectric layer 217, source and drain electrodes 216a and 216b, and a passivation layer 218, sequentially formed on a substrate 200. The storage capacitor includes a storage electrode 240, the gate insulating layer 212, a storage electrode wiring 220, the interlayer dielectric layer 217, the passivation layer 218, and a pixel electrode 230, sequentially formed on the substrate 200.

The channel layer 214 and the storage electrode 240 may be formed on a same surface (or the same plane) of the substrate 200. The channel layer 214 and the storage electrode 240 may be spaced apart from each other. The storage electrode 240 may be a counter electrode to the pixel 230. The storage electrode 240 may be formed with a larger surface area on the substrate 200 between the gate 210 and the storage electrode wiring 220. The channel layer 214 and the storage electrode 240 may be formed of a transparent oxide semiconductor. The transparent oxide semiconductor may include at least one oxide compound selected from the group consisting of zinc oxide, tin oxide, Ga—In—Zn oxide, In—Zn oxide, In—Sn oxide, and combinations thereof. The oxide compound may be doped with at least one metal selected from the group consisting of aluminum (Al), nickel (Ni), copper (Cu), tantalum (Ta), hafnium (Hf), titanium (Ti) and combinations thereof. However, example embodiments are not limited thereto.

The gate insulating layer 212 may be formed on the substrate 200 to cover the channel layer 214 and the storage electrode 240. The gate 210 may be formed on the gate insulating layer 212 disposed on the channel layer 214. The storage electrode wiring 220 may be formed on the gate insulating layer 212 disposed on a portion of the storage electrode 240. The storage electrode wiring 220 may be a wiring used to prevent (or reduce) variation (or fluctuations) of a common voltage applied to the storage electrode 240 caused by a RC delay as described above. As such, the storage electrode wiring 220 may be formed having a smaller width.

The interlayer dielectric layer (ILD) 217 may be formed on the gate insulating layer 212 to cover the gate 210 and the storage electrode wiring 220. The source and drain electrodes 216a and 216b, which are electrically connected to opposing sides of the channel layer 214, may be formed on the interlayer dielectric layer 217 disposed on the gate 210. The source and drain electrodes 216a and 216b may be electrically connected to sides of the channel layer 214 via first and second via holes 151 and 152, respectively, which are formed in the interlayer dielectric layer 217 and the gate insulating layer 212. The source and drain electrodes 216a and 216b may be formed of at least one metal selected from the group consisting of copper (Cu), molybdenum (Mo), aluminum (Al) and combinations thereof. However, example embodiments are not limited thereto. A connection wiring 245, which electrically connects the storage electrode wiring 220 and the storage electrode 240, may be formed on the interlayer dielectric layer 217 disposed on the storage electrode wiring 220. The connection wiring 245 electrically connects the storage electrode wiring 220 and the storage electrode 240 via a fourth via hole 154, which is formed in the interlayer dielectric layer 217, and a fifth via hole 155, which is formed in the interlayer dielectric layer 217 and the gate insulating layer 212. The connection wiring 245 may be formed of a transparent conductive material (e.g., ITO or IZO).

The passivation layer 218 may be formed on the interlayer dielectric layer 217 to cover the source and drain electrodes 216a and 216b and the connection wiring 245. The passivation layer 218 may be formed of a silicon nitride, a silicon oxide, an organic insulator or the like. The pixel electrode 230, may be formed on the passivation layer 218 disposed on the storage electrode 240. The pixel electrode 230 may be a counter electrode to the storage electrode 240. The pixel electrode 230 may be formed of a transparent conductive material (e.g., ITO or IZO). The pixel electrode 230 may be electrically connected to the drain electrode 216b via a third via hole 253 formed in the passivation layer 218.

In the storage capacitor having the above structure, if the TFT is turned on, a pixel voltage applied to the pixel electrode 230 may be retained in the passivation layer 218, the interlayer dielectric layer 217 and the gate insulating layer 212 between the pixel electrode 230 and the storage electrode 240. As such, the panel light transmittivity may increase and/or the charge capacitor may be increased by forming the storage electrode 240, which is formed of a transparent oxide semiconductor, with a larger surface area.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages. Accordingly, all such modifications are intended to be included within the scope of this invention as defined in the claims. In the claims, means-plus-function clauses are intended to cover the structures described herein as performing the recited function, and not only structural equivalents but also equivalent structures. Therefore, it is to be understood that the foregoing is illustrative of various example embodiments and is not to be construed as limited to the specific embodiments disclosed, and that modifications to the disclosed embodiments, as well as other embodiments, are intended to be included within the scope of the appended claims.

What is claimed is:
1. A display device, comprising:
at least one thin film transistor and at least one storage capacitor, both on a substrate, wherein
the at least one storage capacitor includes a storage electrode formed of a transparent oxide semiconductor, and a pixel electrode over the storage electrode, the pixel electrode being separated from the storage electrode by a desired distance,
the at least one film transistor includes a gate, a channel layer corresponding to the gate, and a gate insulating layer between the gate and the channel layer, the channel layer and the storage electrode being on a same surface of the gate insulating layer, and the channel layer is formed of the transparent oxide semiconductor.

2. The display device of claim 1, wherein the transparent oxide semiconductor includes at least one oxide compound selected from the group consisting of zinc oxide, tin oxide, Ga-In-Zn oxide, In-Zn oxide, In-Sn oxide and combinations thereof.

3. The display device of claim 2, wherein the at least one oxide compound is doped with at least one metal selected from the group consisting of aluminum (Al), nickel (Ni), copper (Cu), tantalum (Ta), hafnium (Hf), titanium (Ti) and combinations thereof.

4. The display device of claim 1, wherein the pixel electrode is formed of a transparent conductive material selected from the group consisting of indium tin oxide (ITO), indium zinc oxide (IZO) and combinations thereof.

5. The display device of claim 1, wherein the thin film transistor further includes source and drain electrodes on opposing sides of the channel layer, and a passivation layer covering the source and drain electrodes.

6. The display device of claim 5, further comprising a storage electrode wiring electrically connected to the storage electrode, the storage electrode wiring and gate being on a same surface of the substrate.

7. The display device of claim 5, further comprising an etch stop layer covering the channel layer between the source and drain electrodes.

8. The display device of claim 7, wherein the etch stop layer is formed of a silicon oxide.

9. The display device of claim 5, wherein the passivation layer is between the storage electrode and the pixel electrode.

10. The display device of claim 5, wherein the gate insulating layer and the passivation layer are between the storage electrode and the pixel electrode.

11. The display device of claim 1, wherein the at least one thin film transistor includes a gate formed on the substrate, a gate insulating layer covering the gate, the channel layer corresponding to the gate and formed of the transparent oxide semiconductor, source and drain electrodes on opposing sides of the channel layer, and a passivation layer covering the source and drain electrodes; and the at least one storage capacitor includes a storage electrode wiring on the substrate, the gate insulating layer covering the storage electrode wiring, the storage electrode on the gate insulating layer, the passivation layer covering the storage electrode, and the pixel electrode on the passivation layer.

12. The display device of claim 11, wherein the storage electrode is on the gate insulating layer between the gate and the storage electrode wiring.

13. The display device of claim 11, wherein the pixel electrode is electrically connected to the drain electrode via the passivation layer.

14. The display device of claim 11, wherein the storage electrode is electrically connected to the storage electrode wiring via the passivation layer and the gate insulating layer.

15. The display device of claim 11, wherein the transparent oxide semiconductor includes at least one oxide compound selected from the group consisting of zinc oxide, tin oxide, Ga-In-Zn oxide, In-Zn oxide, In-Sn oxide and combinations thereof.

16. The display device of claim 15, wherein the least one oxide compound includes at least one metal selected from the group consisting of aluminum (Al), nickel (Ni), copper (Cu), tantalum (Ta), hafnium (Hf), titanium (Ti) and combinations thereof.

17. The display device of claim 11, further comprising an etch stop layer between the channel layer and the passivation layer, the channel layer being between the source and drain electrodes.

18. The display device of claim 17, wherein the etch stop layer is formed of a silicon oxide.

19. A display device, comprising:

at least one thin film transistor including a channel layer on a substrate and formed of a transparent oxide semiconductor, a gate insulating layer covering the channel layer, a gate on the gate insulating layer and corresponding to the channel layer, an interlayer dielectric layer covering the gate, source and drain electrodes on the interlayer dielectric layer electrically connected to opposing sides of the channel layer, and a passivation layer covering the interlayer dielectric layer and the source and drain electrodes, and at least one storage capacitor including a storage electrode on the substrate and formed of the transparent oxide semiconductor, the gate insulating layer covering the storage electrode, a storage electrode wiring on and electrically connected to the gate insulating layer, the interlayer dielectric layer covering the storage electrode wiring, the passivation layer on the interlayer dielectric layer, and a pixel electrode on the passivation layer.

20. The display device of claim 19, wherein the storage electrode is on the substrate between the gate and the storage electrode wiring.

21. The display device of claim 19, wherein the transparent oxide semiconductor includes at least one oxide compound selected from the group consisting of zinc oxide, tin oxide, Ga-In-Zn oxide, In-Zn oxide, In-Sn oxide and combinations thereof.

22. The display device of claim 21, wherein the at least one oxide compound is doped with at least one metal selected from the group consisting of aluminum (Al), nickel (Ni), copper (Cu), tantalum (Ta), hafnium (Hf), titanium (Ti) and combinations thereof.

* * * * *